Aug. 9, 1949.

H. B. SHAPER 2,478,329

MOUNTING MEANS FOR THE MOVING COILS OF
ELECTROMECHANICAL TRANSLATING DEVICES

Filed Aug. 27, 1945

INVENTOR.
HARRY B. SHAPER
BY
Ebey J. Hyde
ATTORNEY

Aug. 9, 1949.                    H. B. SHAPER                    2,478,329
          MOUNTING MEANS FOR THE MOVING COILS OF
              ELECTROMECHANICAL TRANSLATING DEVICES
Filed Aug. 27, 1945                                     6 Sheets-Sheet 2

INVENTOR.
HARRY B. SHAPER
BY
Eber J. Hyde
ATTORNEY

Aug. 9, 1949.  H. B. SHAPER  2,478,329
MOUNTING MEANS FOR THE MOVING COILS OF
ELECTROMECHANICAL TRANSLATING DEVICES
Filed Aug. 27, 1945  6 Sheets-Sheet 3

INVENTOR.
HARRY B. SHAPER
BY
*Elmer J. Hyde*
ATTORNEY

Patented Aug. 9, 1949

2,478,329

UNITED STATES PATENT OFFICE 2,478,329

MOUNTING MEANS FOR THE MOVING COILS OF ELECTROMECHANICAL TRANSLATING DEVICES

Harry B. Shaper, Cleveland Heights, Ohio, assignor to The Brush Development Company, Cleveland, Ohio, a corporation of Ohio Application August 27, 1945, Serial No. 612,933

8 Claims. (Cl. 171—95)

My invention pertains to an electro-mechanical translating device such as a pen recorder or galvanometer.

An object of my invention is to provide an electro-mechanical translating device for actuating a writing instrument, mirror, or the like.

Another object of my invention is to provide an electro-mechanical translating device for actuating a writing instrument wherein the inertia forces of the writing instrument are kept at a minimum.

A further object of my invention is to provide an electro-mechanical translating device having an extended frequency range.

It is also an object of my invention to provide an electro-mechanical translating device whose centering mechanism is easily operated.

A further object of my invention is to provide means for preventing dirt from entering the housing of an electro-mechanical translating device.

A further object of my invention is to provide a method of strongly magnetizing a permanent magnet used in an electro-mechanical translating device.

Another object of my invention is to provide a construction which yields an increase in the air gap flux when a plurality of the devices are placed in juxtaposition over that which is achieved when the devices are used alone.

A further object of my invention is to provide an electro-mechanical translating device whose phase shift over its frequency range is substantially a linear function of frequency.

Still another object of my invention is to provide a method of assembling an electro-mechanical translating device which reduces the amount of magnetism usually lost from the permanent magnet in the process.

Other objects and a fuller understanding of my invention may be had by referring to the following description and drawings wherein Figure 1 is a sectional view of an electro-mechanical device taken along line 1—1 of Figure 2.

Figure 7:
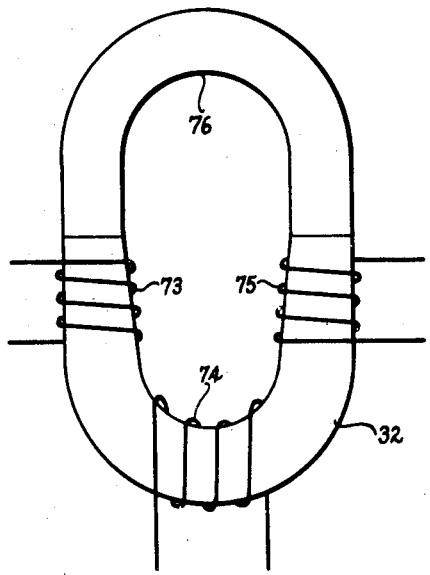
Figure 8:
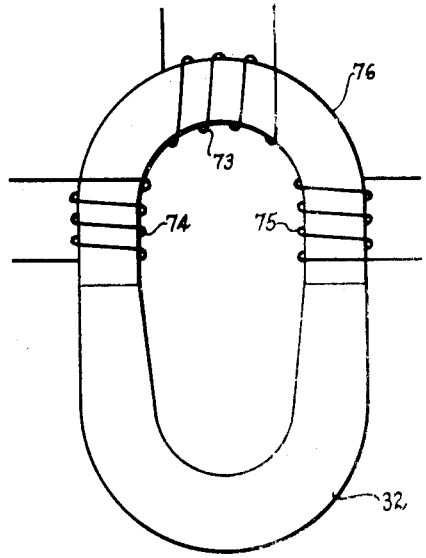
Figure 9:
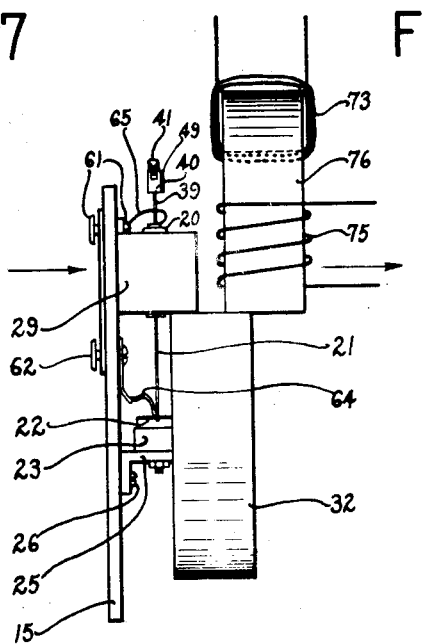

Figures 7, 8, and 9 illustrate steps in the process of magnetizing the permanent magnet and in assembling the device.

Figure 10:
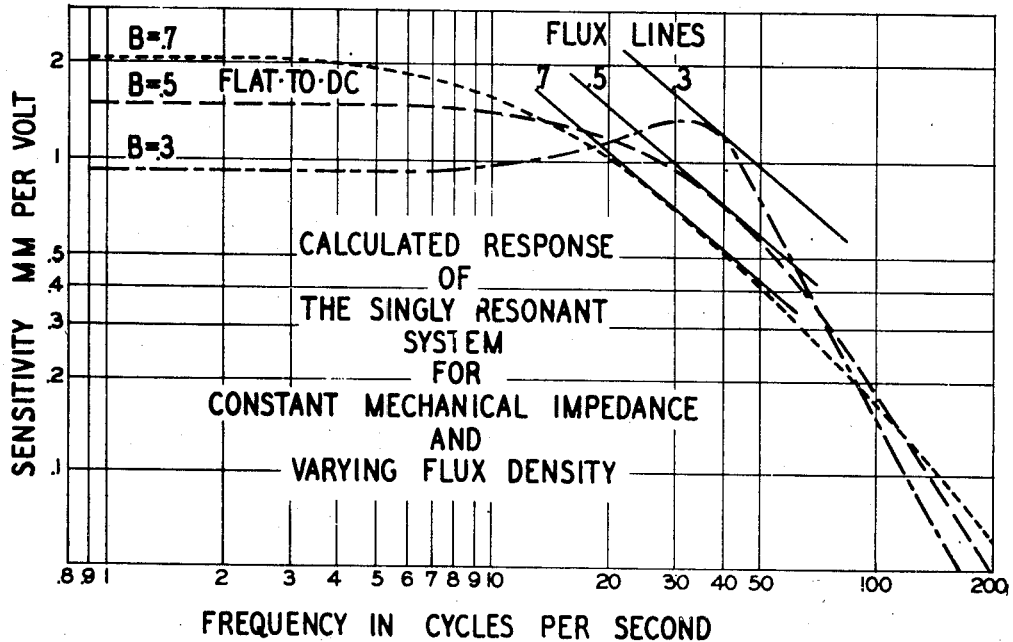

Figure 10 is a graph showing the effect of varying the mechanical impedances of the device for constant flux density in its air gap.

Figure 11:
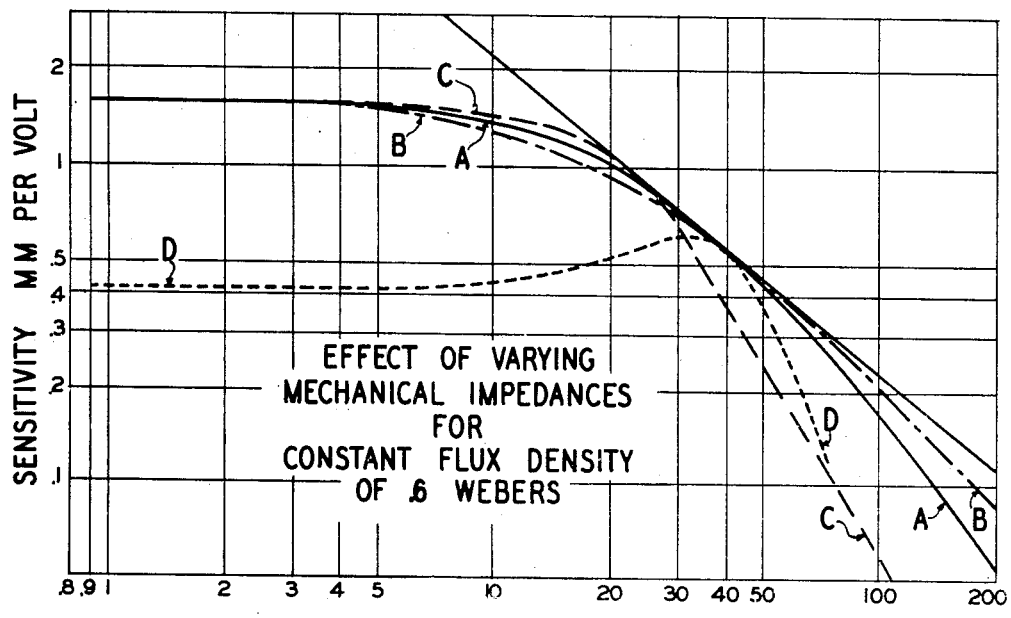

Figure 11 is a graph of the calculated response of the device wherein the mechanical impedance is constant and the flux density is varied.

Figure 12:
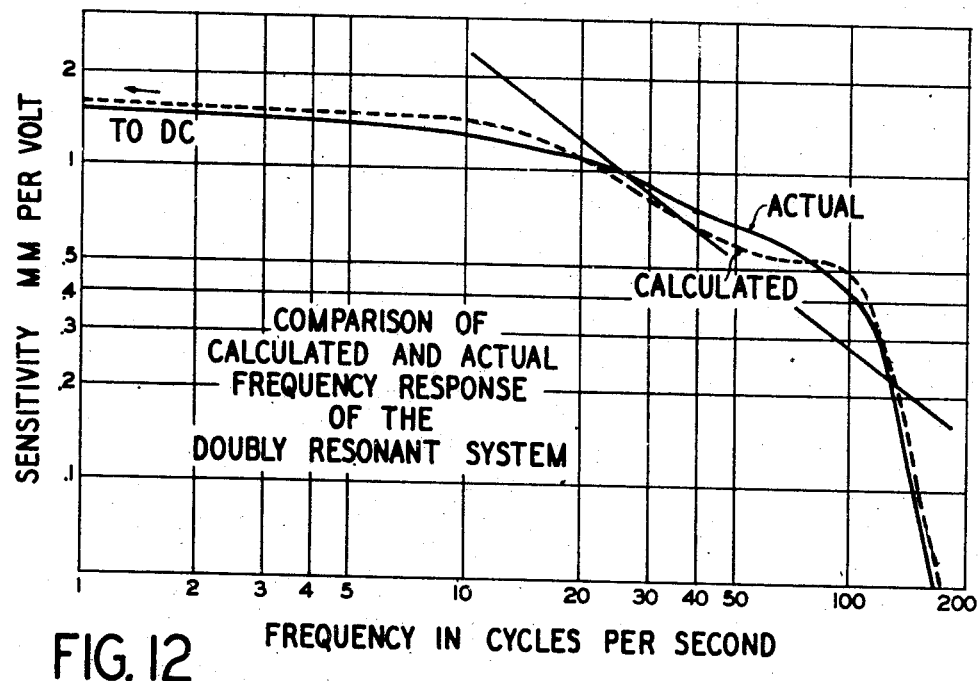

Figure 12 is a graph comparing the calculated and actual frequency response of an electro-mechanical translating device having a doubly resonant system.

Figure 13:
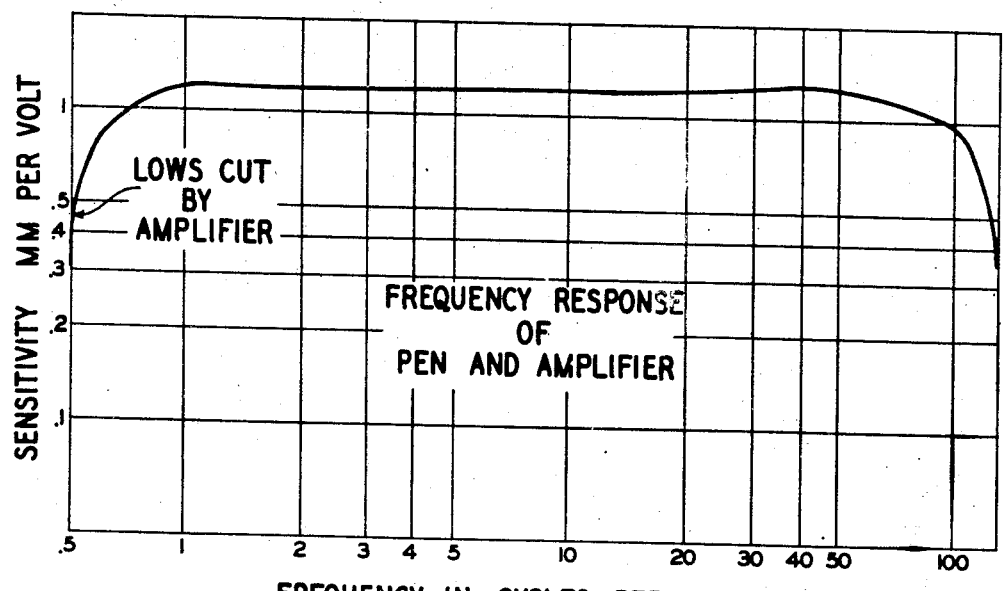
Figure 14:
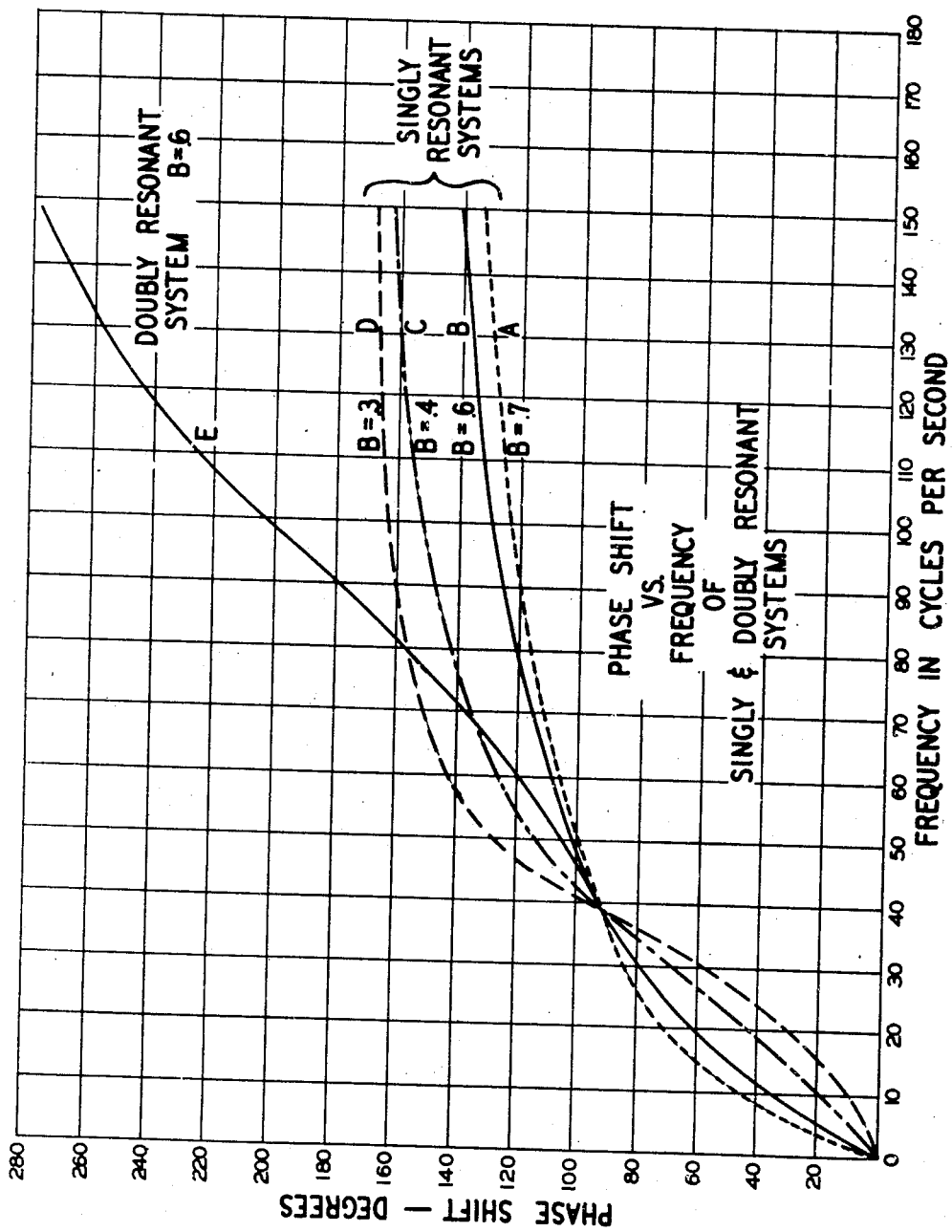

Figure 13 is a graph showing the frequency response of the translating device after correction by the amplifier, and Figure 14 is a graph showing the phase shift characteristics of a doubly resonant device compared to the phase shift characteristics of several singly resonant systems.

A moving coil galvanometer consists essentially of a movable coil mounted by springs between the poles of a permanent magnet, and a pointer or the like is connected to the coil. The deflection of the pointer is proportional to the electrical current passing through the coil. The position of equilibrium assumed by the coil for any particular value of direct current is governed by the interaction between the magnetic fields of the coil and the permanent magnet and the opposing force of the springs by which the coil is mounted to resist rotation. The coil assembly consists of a coil of very fine enameled wire mounted on springs which hold it between the poles of the permanent magnet, and the ends of the coil are connected into an electric circuit whose current is to be measured or indicated. The permanent magnet is usually horseshoe shaped with the pole pieces arranged to concentrate the magnetic field or flux in the space in which the coil moves, and a soft iron core often is provided within the orbit of the coil effectively to reduce the air-gap between the poles of the permanent magnet and to help to concentrate the flux through the coil.

Figure 1:
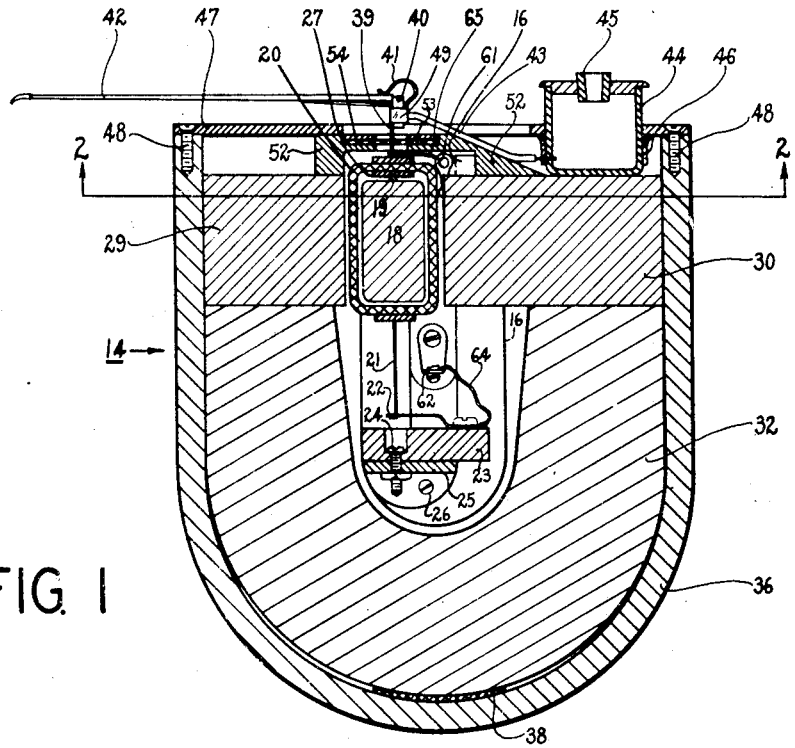
Figure 2:
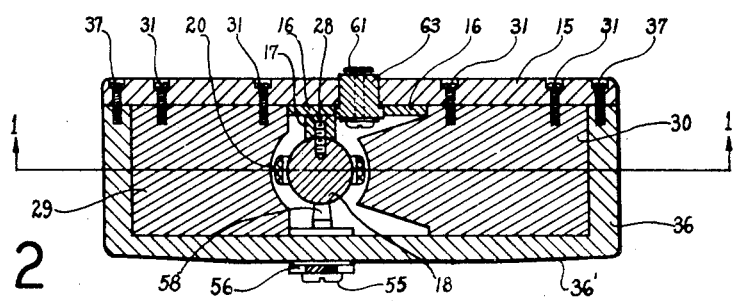
Figure 2 is a sectional view taken along line 2—2 of Figure 1.
Figure 3:
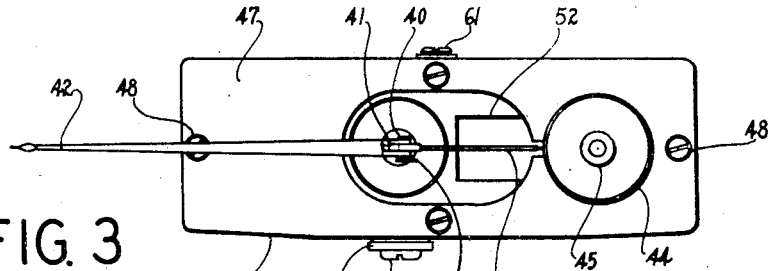
Figure 3 is a top view of the device.

Figures 1 and 2 illustrate by cross-sectional views an electro-mechanical translating device of the galvanometer type indicated generally by the reference character 14. The device comprises an aluminum base plate 15 which has secured to one of its faces either by screws or by adhesive material two aluminum positioning strips 16. Connected to one of the positioning strips 16 by screws (not shown) is a brass supporting member 17, and a soft iron core 18 is connected by screw 28 to the brass supporting member. The core 18 is thus fixed to the base plate 15 in a manner which prevents rotation thereof. The iron core 18 includes a pivot point 19 on its upper end. A coil of wire 20 is positioned around the soft iron core 18 with a pivot block 27 which is connected to the coil in engagement with the pivot point 19. This pivot block 27 which is between the coil and the pivot 19 may be made of a material such as brass or steel to receive and minimize the wear incident to the turning of the coil with respect to the core and to prevent this wear from shorting out in the coil 20. This block 27 may be connected to the coil by adhesives such as shellac or the like. One end of a torsion wire 21 is connected by solder or the like to a plate which is cemented to the lower end of the coil 20 and the other end of the wire 21 is connected by solder or the like to a flat spring 22. The spring 22 is mounted by means of solder or screws or the like to a pivotable adjusting block 23 and the block 23 is connected to the fixed brass plate 25 by means of the screw 24 which allows the block 23 to twist with respect to the mounting plate 25. This relative motion between block 23 and plate 25 should not be without considerable frictional resistance as the block 23 should maintain any position that it is rotated to without losing it during operation of the translating device. The brass mounting plate 25 is connected to the base plate 15 by means of screws 26. The spring 22 applies a tensional force to the wire 21 and to the coil 20, thus forcibly holding the pivot block 27 down on the pivot point 19. By this construction the coil 20 is suspended around the core 18 and rotation of the coil with respect to the core establishes frictional force only at the pivot 19 and establishes torsional force in the resilient wire 21. Two soft iron pole tips 29 and 30 are connected to the base plate 15 by means of screws 31, and these two pole tips are so positioned with respect to the core 18 and the coil 20 and the tip of pole 30 is so shaped that flux through the pole tips is focused through the core 18 thereby establishing a concentrated and uniform magnetic field at the air-gap. The coil 20 is positioned in the small air gap between the core and the pole tips at the location of this uniform flux field. The positioning strips 16 serve to align the pole tips 23, 30 as is shown in Figure 2. A powerful permanent horseshoe magnet 32 is positioned with its ends, respectively, against the soft iron pole tips 29 and 30. This permanent magnet is strong enough so that magnetic forces established by it serve to hold it in place against the pole tips without the use of screws or adhesives. A magnetic circuit is formed by the magnet 32 through the pole tips 29, 30 across the air gap between the pole tips, and through the core 18.

By referring to Figure 1 it will be noted that the pole tip 29 is shorter than the pole tip 30, and that because of this the coil 20 is offset to one side of the centerline of the magnet 32. The pen 42, which is connected to the coil 20 in a manner to be described, extends over the smaller of the two pole tips. Thus the length of the pen necessary to reach a moving paper chart is kept to a minimum and extends along the thin section of the unit, thereby reducing the high inertia forces incident to a long pen.

A cover 36 comprised of two side portions, a bottom portion, and a front face 36' is connected to the base plate 15 by means of screws 37 extending into the side portions. A felt pad 38 or the like is positioned between the bottom of the housing 36 and the bottom of the horseshoe magnet 32.

Connected to the top part of the coil 20 by means of a short torsion wire 39 is a pen holder 40 which includes a spring 41 for connecting the pen to the pen holder 40. The pen is hollow and tapers to a small diameter at the tip which engages a moving paper chart. The other end into which ink is fed is of larger diameter. When the pen is moving across the paper chart due to rotation of coil 20 centrifugal force helps the flow of ink toward the tip, and as the paper moves under the tip of the pen, ink is "pulled" from the tube. Thus, even though the pen were not moving across the paper chart, sufficient force is established by the movement of the paper to assure flow of the ink. A rubber tube 43 extends from an inkwell 44 to the larger end of the pen 42 for feeding ink thereto. The inkwell is held to the housing 36 by means of the metal band 46 which extends around the inkwell and is connected to the housing 36 by means of screws (not shown). A top cover 47 is connected to the housing 36 by means of screws 48. This housing has an opening for the inkwell and through which the pen 42 and the tube 43 extend. A brass bridge 52 is connected to the base plate 15 by screws or the like (not shown) and extends from pole tip 29 to pole tip 30 bridging the air gap and core 18. This brass bridge has a hole in it through which the torsion wire 39 extends to the pen holder 40. A rubber gasket 53 is positioned across this opening in the brass bridge 52 and the wire 39 extends through this rubber gasket. A brass plate 54 fits down onto the rubber sealing member for holding the member 53 in place. By this arrangement a dust-proof seal is provided at the torsion wire 39 without exercising undue restraint on the torsional motions of this wire.

Cemented to the side of the pen holder 40 is a small mirror 49 which may be used either in conjunction with the recording pen 42 or separately to reflect a focused beam of light onto a strip of moving film or onto a graduated scale. When used without the pen 42, the pen may be removed from the holder 40.

Figure 4:
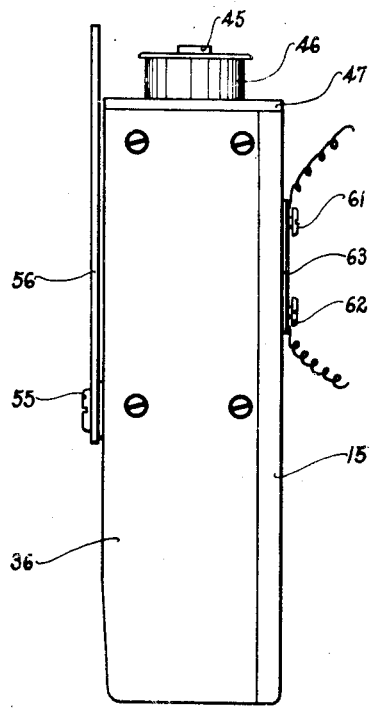
Figure 4 is an end view of the device.
Figure 5:
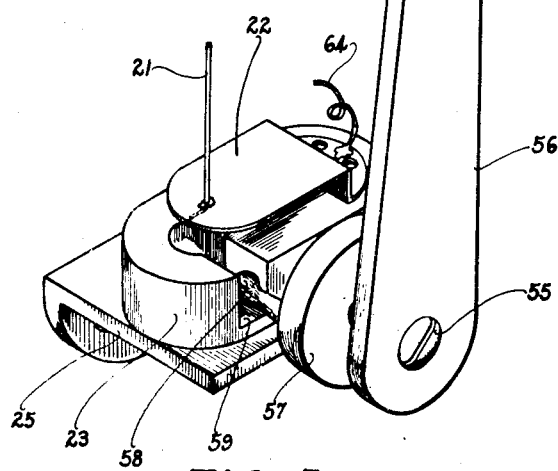
Figure 5 is an isometric view of the centering portion of the device.

Means are provided for adjusting the neutral position of the pen 42. Mounted externally on the side 36' of the cover is a lever 56 which is connected through the cover to an inner disk 57 by means of the screw 55. The lever 56 (as is shown in Figure 4) extends above the top surface of the inkwell. When this lever is moved laterally with respect to the housing the arm 58, which is eccentrically mounted on the disk 57, is moved through a small arc. The arm 58 has at its outer end a ball which fits into a slot 59 in the pivotably mounted adjusting block 23. Due to the force transmitted from the lever to this arm 58 the adjusting block 23 is caused to rotate slightly about the screw 24, thus twisting the wire 21 and causing the coil 20 and, consequently, the pen 42 to adopt a new position. It is desirable that the axis of the wire 21 extend substantially through the axis of the screw 24 so that motion of the block 23 about the screw 24 will not introduce a side-wise motion to the coil 20.

Electrical terminals 61 and 62 are provided extending through the base plate 15 of the housing. These terminals are mounted in phenolic condensate material such as a "Bakelite" strip 63 inserted into the base plate 15 in order to prevent short circuits. Wires from any external source of electrical signal may be connected to the outer portion of these terminals 61 and 62. Within the housing there is a wire 65 connecting the terminal 61 to the torsion wire 39 and the torsion wire is connected to the coil of wire 20. A wire 64 connects the terminal 62 to the spring 22 and the spring 22 is electrically connected to the other end of the coil of wire 20 by means of the torsion wire 21. Thus an electrical circuit is established from the terminal 61 through the coil 20, through the wire 21 and spring 22 to the wire 64, and thence to the terminal 62.

Figure 6:
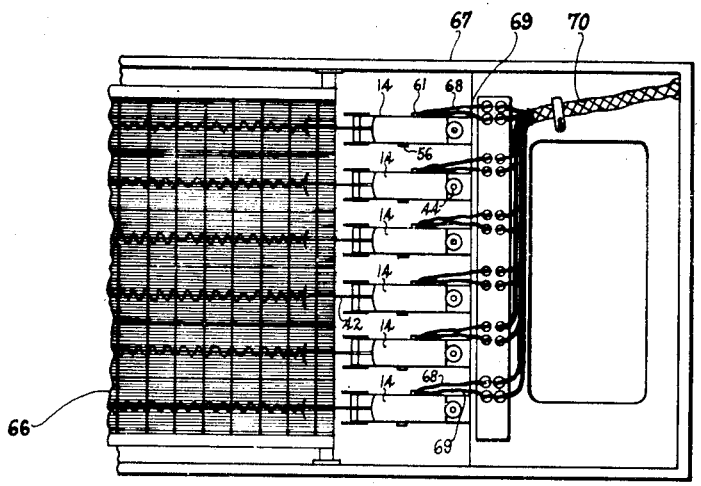
Figure 6 is a top view showing six of the electro-mechanical translating devices connected together side-by-side in a six-channel pen recorder.

Figure 6 illustrates a six-channel pen recorder, the six electro-mechanical translating devices 14 being mounted side-by-side and close together with their pens 42 in contact with a strip of paper 66. The adjusting levers 56 extend up between adjacent translating devices so that the location of each of the pens on the paper may be readily adjusted without the use of special tools extending down in between the adjacent translating devices. The wires 68, 69 which are connected to the terminals 61 and 62 are formed into a cable 70 which extends to the six sources of signal voltage. Suitable mechanism, of course, is provided for moving the paper at a substantially continuous rate of speed and the entire device comprising paper drive, paper rolls, and translating devices is mounted in a suitable rigid frame.

By stacking a number of the individual magnetic units 14 together side-by-side with their like magnetic poles in the same relative position additional magnetic flux is obtained across the air gap wherein the coil 20 is positioned. Each of the magnetic units has considerable leakage flux, i. e., flux which is outside of the magnetic material which comprises the magnetic circuit, and loss of this magnetic flux reduces the efficiency of the unit. By stacking a number of magnetic units 14 side-by-side with their like magnetic poles in the same relative position, a considerable amount of this flux which heretofore was leakage flux is confined to the magnetic circuit due to the repelling force of the external field of the next adjacent magnetic unit. Thus, by using the well-known fact that like magnetic poles oppose each other, a more efficient device is obtained.

Figures 7, 8 and 9 illustrate a method of magnetizing the permanent magnet 32 to a very high degree. It comprises connecting three coils 73, 74 and 75 each having a number of turns of very heavy wire around the magnet 32. Care should be exercised to make sure that these coils are symmetrically placed about the center line of the horseshoe magnet, otherwise unsymmetrical magnetization will take place. A keeper 76 of soft iron is placed across the open ends of the horseshoe magnet 32 bridging the air gap between the legs thereof. The three coils 73, 74 and 75 are connected in series to a condenser and the condenser is discharged through these three coils. I have found it satisfactory to discharge a current of about 1000 amps. through these coils from a condenser of about 4000 mfds. charged to about 450 volts, and a number of such discharges should take place to bring the permanent magnet 32 up to its maximum amount of magnetism. The coils 73, 74 and 75 are then disconnected from the condenser and are slid up onto the keeper 76. The keeper 76 is then slid part way off the magnet 32, and at the same time a sub-assembly comprising the base plate 15, the soft iron pole tips 29, 30 and the core 18 is slid into place on the magnet 32. Thus at no time is a large air-gap established between the legs of the permanent magnet 32. As the keeper 76 is entirely removed from the magnet 32, the soft iron pole tips are slid into place, thus the magnet 32 retains substantially all the magnetism imparted to it by the condenser discharge process.

The simple method whereby a writing pen is directly attached to a driving coil in the magnetic field and the holder suspended from a stiff torsion wire, the system then having a single resonant frequency, I shall hereby designate as the "singly resonant" system.

I have discovered a method of coupling a pen to a driving coil which substantially increases the frequency response range of my device over this "singly resonant" system. I shall designate as the "doubly resonant" system my arrangement whereby the inking pen is coupled to the driving coil by means of a torsion wire and the driving coil in its magnetic field is in turn suspended by a torsion wire.

Figure 11 demonstrates the inherent limitation of the "singly resonant" system. At low frequencies this system has an amplitude determined by the flux density in the air gap, the stiffness of the wire, and the number of turns and resistance of the coil. Thus, for a given voltage applied, the low frequency sensitivity is partially determined by the resistance of the wire which permits a given current. The current flowing in the coil then generates a force which overcomes the restraint of the torsion spring and produces a given pen deflection. Thus, for low frequencies (and those frequencies approaching resonance) the amplitude is independent of frequency. At frequencies in the neighborhood of resonance, however, the mechanical system has a mechanical impedance approaching zero, and the amplitude of the coil will then obtain such a value that the back E. M. F. generated by the current for the given frequency of oscillation will approach the driving voltage applied. In other words, the electrical apparent impedance rises sharply at resonance to such a value as is determined mainly by the flux in the air gap and the number of turns in the coil. When frequencies higher than the resonant mechanical frequency are applied, the system cuts off sharply since the amplitude is now controlled by the mass of the coil and the driving force obtained from the current through the coil.

When it is desired to obtain essentially flat frequency response over the range, it is necessary to obtain a flux density in the air gap of such relation to the impedances of the mechanical suspension system that the amplitude at resonance, determined by the back E. M. F., will just equal the amplitude obtained by the stiffness of the torsion spring at low frequencies (whose amplitude is determined by the current in the coil in relation to the stiffness of the restoring spring). It is in the "singly resonant" system that the degree of freedom of adjustment of the circuit parameters is strictly limited to the value of flux density if over-all flatness of reponse is desired up to and including the resonant frequency.

I have found that if a "doubly resonant" system is used wherein the inking pen mass (approximately equivalent to the coil mass) is coupled to the driving coil by means of a torsion wire, the essentially flat frequency range can be extended up to the resonant frequency determined by the pen and the pen torsion wire suspension; and Figure 12 illustrates by a graph the extension of the frequency range which can be obtained by my "doubly resonant" system over curve A of Figure 11 which is a graph of the "singly resonant" system and which definitely approaches cutoff at 50 cycles per second. The same electro-mechanical system which yields Curve A with an additional torsion wire between the coil and the pen to give a "doubly resonant" system has its cutoff frequency in the neighborhood of 100 cycles per second. The action of the extra coupling torsion wire (reference character 39 in Figure 1) is such that in the neighborhood of 50 cycles to 100 cycles, where the "singly resonant" system is approaching cutoff due to the action of the directly coupled masses of the pen and the driving coil, the "doubly resonant" system decouples the pen mass from the coil mass so that the coil mass is essentially vibrating through small amplitudes, while the pen mass on its torsion suspension wire is vibrated at resonance with large amplitude. Thus, while the pen mass is coupling directly to the electrical system, the coil mass is now removed from the circuit and acts only as a force coupling device. Therefore, it can be stated that the effective mass of the "doubly resonant" system at high frequencies is substantially lower than that of the "singly resonant" system.

In addition the "doubly resonant" system has a phase shift which is a more linear function of frequency than the "singly resonant" system. As shown in Figure 14, curve E, the "doubly resonant" system has a phase shift which is substantially a linear function of frequency over the range from zero to 150 cycles per second; whereas the equivalent "singly resonant" system has a phase shift which deviates from linearity with frequency at 50 cycles per second as demonstrated by curve C.

In order to appreciate the benefits resulting from the "doubly resonant" system it is necessary to make a detailed examination of the performance and limitations of the "singly resonant" system. The equations of motion are derived, using the M. K. S. system of units as they are more convenient when dealing with electro-mechanical systems. Although all the motions are rotary around the pivot 19, the equations are written as though the forces and impedances act at the radius of coil 20.

If a voltage, E, from a zero impedance source is placed across the electrical terminals of the coil in the magnetic field, then $$E = iR + Blv \quad (1)$$

where
R = electrical resistance of the coil (ohms)
i = current (amperes)
B = flux density of the gap (webers)
l = effective length of coiled wire (meters)
v = the velocity of the coil along the circumference of the pivoted coil (meters/sec.)

This equation defines the relationship whereby the voltage must equal the $iR$ drop plus the back E. M. F. ($Blv$) generated by the coil 20 moving in the flux field.

On the mechanical side, the current in the coil produces a force which must be equalled by the mechanical impedance multiplied by the velocity of $$Bli = Z_m v \quad (2)$$

where
$Z_m$ = the mechanical impedance of the coil, pen, and wire.

In the example under consideration $$Z_m = j\omega(M_1 + M_2) + \frac{1}{j\omega c_1}$$

where
$\omega = 2\pi \times$ frequency
$M_t = M_1 + M_2 =$ the effective mass of the pen and coil at the circumference of the coil (kilograms)
$C_1 =$ the compliance of the wire suspension in meters/Newton.

Rewriting:

$$E = Ri + Blv \quad (1)$$

$$0 = -Bli + \left[j\omega M_t + \frac{1}{j\omega c_1}\right]v \quad (3)$$

Solving for the velocity of the coil $$v = \frac{EBl}{R\left[j\omega M_t + \frac{1}{j\omega c_1}\right] + B^2 l^2} \quad (4)$$

Since $$v = \frac{dA}{dt}$$

where A is the displacement, the $v = j\omega A$ for sinusoidal motions. Or $$A = -jE\left[\frac{Bl}{\frac{R}{jc_1} + j\omega^2 R M_t + \omega B^2 l^2}\right] \quad (5)$$

Thus, the amplitude of motion is described as a function of the parameters of the system.

At low frequencies, ($\omega = 0$), Equation 5 becomes $$A = \frac{EC_1 Bl}{R} \quad (6)$$

Thus, the sensitivity at low frequencies is proportional to flux density B and compliance $C_1$, and is flat with frequency. This result is clearly shown in Figure 10. The curves show that as B is varied the low frequency sensitivity is proportional to the flux density in the gap.

At the mechanical resonance of the system, $$\left(\omega^2 = \frac{1}{M_t C_1}\right)$$

Equation 5 simplifies to $$A = \frac{-jE}{\omega Bl} \quad (7)$$

Thus, the amplitude at resonance is determined solely by the frequency and the flux density. Therefore, if the mechanical resonant frequency is kept constant, the amplitude at resonance is actually inversely proportional to the flux density. In the curve for B=.3 weber drawn in Figure 10, the mechanical resonance occurs at 38 cycles per second, and for higher flux density the amplitude of response is actually decreased.

This limiting effect of the locus line defined by Equation 7 is again demonstrated in Figure 11. In this figure, the mechanical impedances are varied and the flux density B is kept constant at .6 weber. Curve A is the curve obtained for the pen motion when $M_t$ and $C_1$ are kept at a given value. The curve A is tangent to the locus line at 38 cycles per second. Curve B is obtained by arbitrarily cutting the value of $M_t$ in half. The resonant frequency is now 53 cycles per second but the curve is still tangent to the locus line. Curve C is obtained by doubling the mass $M_t$. The resonance now occurs at 27 cycles per second, but is again limited by the locus line. Curve D is repeated for $M_t$ doubled and $C_1$ cut to ¼ its normal value. Thus, in spite of violent changes in mechanical impedance, the amplitude at resonance is always limited by the locus line. This is explained by the mechanical impedance approaching zero at resonance and it is only the flux density which can limit the motion of the coil by the generation of back E. M. F.

From Figure 10 it can also be seen that a decrease in flux density allows an extension of the flat frequency response at the expense of obtaining an underdamped system.

It is possible to break across this locus line to extend the frequency range of the system by using a "doubly resonant" system where the compliance $C_2$ is introduced by connecting the pen 42 to the coil 20 by means of the compliant supporting wire 39.

The equations of motion now become $$E = Ri + Blv_1 + [0]v_2 \qquad (8)$$

$$0 = -Bli + \left[j\omega M_t + \frac{1}{j\omega C_1}\right]v_1 - j\omega M_2 v_2 \qquad (9)$$

$$0 = [0]i - j\omega M_2 v_1 + \left[j\omega M_2 + \frac{1}{j\omega C_2}\right]v_2 \qquad (10)$$

where $v_1$ is the circumferential velocity of the coil
$v_2$ is the velocity of the pen referred to the coil radius.

Equation 8 is the same as Equation 1 and is derived in the same manner. Equation 9 states that the force generated in the coil, $Bli$, must equal the mechanical force required by the moving coil plus the force required to move the pen $M_2$. The velocity of the pen $v_2$, depending on its phase, will either add or subtract from the mechanical force. Equation 10 defines the mechanical equilibrium conditions when no current flows in the coil. The two masses at their respective relative velocities must be in balance or else the coil would be accelerated in space.

Solving for $v_2$ which is the velocity of the pen and of main interest, and resolving $v_2$ to $A_2$, the displacement of the pen:

$$A_2 = \frac{-jEBl}{\left[jR\omega^2(M_1+M_2)+\frac{R}{jC_1}\right][1-\omega^2 M_2 C_2] + \omega B^2 l^2[1-\omega^2 M_2 C_2] + jR\omega^4 M_2^2 C_2} \qquad (11)$$

At low frequency ($\omega = 0$), Equation 11 yields $$A_2 = \frac{EBlC_1}{R} \qquad (12)$$

Thus, there is no change in low frequency displacement sensitivity.

At the resonant frequency between $$M_1 + M_2 = M_t$$

and $C_2$ $$A_2 = \frac{-jEBl}{\omega B^2 l^2[1-\omega^2 M_2 C_2] + jR\omega^4 M_2^2 C_2} \qquad (13)$$

Here it is seen that the response can break across the boundary line of the flux locus. In the denominator, the parameters $M_2$ and $C_2$ can be adjusted independently so that the amplitude at resonance is essentially the same as that for the low frequency. This gives an extension of the flatness of response which is shown in Figure 12.

At the resonant frequency of $M_2$ and $C_2$, $$(1-\omega^2 M_2 C_2 = 0)$$

$$A_2 = \frac{-EBl}{R\omega^4 M_2^2 C_2} \qquad (14)$$

$$\left[\text{Since } \omega^4 = \frac{1}{M_2^2 C_2^2}\right]$$

$$A_2 = \frac{-EBlC_2}{R} \qquad (15)$$

Clearly, then, by selecting $M_2$ and $C_2$ in correct proportions, a system can be designed to give the most desirable response.

For the actual design shown in Figure 1, the following values were selected:

(Values are arbitrarily referred to .3" radius)

$M_1 = 2.25$ gms _____ $= .00225$ kgms.
$M_2 = 2.25$ gms _____ $= .00225$ kgms.
$C_1 = 4 \times 10^{-4}$ cm./dyne $= 4 \times 10^{-3}$ meters/newton
$C_2 = 1.5 \times 10^{-6}$ cm./dyne $= 1.5 \times 10^{-3}$ meters/newton
$B = 6000$ gauss _____ $= .6$ webers
$l = 10,700$ cm _____ $= 107$ meters
$R = 1,450$ ohms _____ $= 1,450$ ohms When these values are inserted in Equation 11, the frequency response shown in Figure 12 is obtained. The theoretical or calculated curve is in excellent agreement with the actual curve obtained.

Note that the response at 100 cycles per second is not brought up to the full sensitivity of the low frequencies. The reasons for designing the pen motor this way are threefold:

One: A careful examination of Equation 11 and a few trial calculations will show that as $C_2$ is made softer and the amplitude of the second resonance (90 cycles per second) is brought up, the amplitude at the first resonance is increased in accordance with Equation 13. This can be carried to the point where an undesirable peak in the displacement occurs at the first resonance.

Two: By requiring amplifier compensation at the high frequencies, it is possible to limit the voltages applied at high frequencies to such values that no pen breakage occurs. Thus the amplitudes and consequent accelerations of the pen are limited to safe values by the automatic overload of the amplifier at high frequencies.

Three: The values selected yield a system with a more linear phase shift.

The pen recorder is designed to record transients where it is essential to have as nearly as possible a linear phase shift throughout the frequency range and critical damping at the cutoff frequency.

Figure 14 shows phase shift versus frequency curves for "singly resonant" systems having four different flux densities and for the "doubly resonant" system.

The "singly resonant" systems are severely limited in phase shift linearity to about 50 cycles per second. Note that there is an optimum flux density ($B = .4$ webers) for linear phase shift for the "singly resonant" system (curve C).

Curve E is the phase shift for the "doubly resonant" system with the design values as given above. Here the improvement in linearity of phase shift is marked and extends up to 150 cycles per second.

Note that curve E has an S-shaped curve in the direction which indicates a slightly overdamped condition. This selection is made to correct for the internal impedance of the driving amplifier. In Equation 11, R is defined as the resistance of the coil. Actually the value of R should be increased to include the resistance of the amplifier internal impedance. This effectively results in a decrease of the damping effect of the flux.

In actual practice it was found that the amplifier could have an internal impedance of 250 ohms (compared with 1450 ohms for the coil) without materially affecting the "critical damping" and linear phase shift requirement.

For best results the effective mass of the coil should be about equal to the effective mass of the pen. By "effective mass" is meant that mass which would replace the mass of the whole structure at any given radius and would require the same force to achieve the same acceleration.

Also, the resonant frequency determined by the pen and coil masses and the compliance of the coil supporting wire 21 should be about twice the resonant frequency determined by the mass of the pen and the compliance of the pen supporting wire 39; and the compliance of the wire 39 should be about one-third to one-fifth the compliance of the wire 21 supporting the coil 20.

While I have described my invention with a certain degree of particularity, it is to be understood that changes can be made in the system without departing from the spirit and scope of my invention.

I claim as my invention:

1. In an electromechanical translating device, a base, a magnet system having air gap therein and connected to said base, a coil, connecting means attached to said base and to said coil for holding said coil in said air gap; said connecting means comprising a platform connected to said base and spaced from said coil in a direction in line with the longitudinal axis of said coil, adjustment means turnably mounted on said platform, the axis about which said adjustment means turns being aligned with the longitudinal axis of said coil, and resilient means connecting said adjustment means to said coil, said resilient means being aligned with the axis of said coil; and means for rotating said adjustment means to cause said coil to rotate substantially about its axis.

2. An electromechanical translating device as set forth in claim 1 with the further characterization of cover means which together with said base encloses said magnet system and said connecting means, a lever movably mounted on the outside of said cover, and eccentric means on the inside of said cover and connected through the cover to said lever for turning therewith, a portion of said eccentric means engaging a portion of said adjustment means for turning said adjustment means as said lever is moved.

3. In an electromechanical translating device, a base, a magnet system mounted on said base and having an air gap between its pole tips, a core of magnetizable material connected to said base and positioned in said air gap, said core at one end having a portion of a bearing, support means, means turnably mounting said support means on said base, spring means mounted on said support means and spaced from the said core on the opposite side thereof from said bearing, a coil positioned around said core and including a bearing portion at one end thereof for cooperatively engaging the bearing portion of said core, and means connecting the end of said coil opposite its bearing end to said spring means, said connecting means and said bearing means lying substantially on the longitudinal axis of said coil means, said spring means pulling on said coil means to maintain the bearing engagement between said core and said coil.

4. In an electromechanical translating system for actuating a device such as a mirror, pen or the like, a magnet system having an air gap, a magnetizable core held with respect to said magnet system in said air gap, a movable coil around said core and in said air gap, bearing means between said core and said coil whereby said coil can turn with respect to said core, and tensioning means connected to said coil at a point on the opposite side of said core from said bearing means and pulling on said coil with respect to said core for maintaining said bearing engagement between them, and torsionally compliant wire means connected to said coil at said bearing end and extending away therefrom in alignment with the axis of said coil for carrying said mirror, pen or the like.

5. In an electromechanical translating system for actuating a writing pen or the like body, a magnet system having an air gap, a coil of wire, torsionally compliant means suspending said coil in said air gap for rotatable movement with respect to said magnet system, and torsionally compliant means connecting said body to said coil, the effective mass of said body being substantially equal to the effective mass of said coil, and the compliance of the means connecting said body to said coil being one-third to one-fifth the compliance of the compliant means suspending said coil in said air gap.

6. In an electromechanical translating system for actuating a writing pen or the like body, a magnet system having an air gap, a coil of wire, suspension means comprising torsionally compliant means suspending said coil in said air gap for rotatable movement with respect to said magnet system, and torsionally compliant means connecting said body to said coil, the effective mass of said body being on the order of the effective mass of said coil, and the compliance of the torsionally compliant means connecting said body to said coil being less than the compliance of the torsionally compliant means suspending said coil in said air gap.

7. In an electromechanical translating system for actuating a writing pen or the like body, a housing having an opening, a magnet system having an air gap connected to said housing, a coil of wire within said housing, first torsionally compliant means one end of which is connected to said housing and the other end of which is connected to said coil suspending said coil in said air gap for rotatable movement with respect to said magnet system, and second torsionally compliant means connecting said body to said coil, said second compliant means extending through said opening in said housing from said coil within said housing to said body outside of said housing and sealing means through which said second compliant means extends sealing said opening in said housing to substantially prevent dust and dirt from entering said housing while exercising substantially no torsional restraint on said second compliant means.

8. In an electromechanical translating system for actuating a writing pen or the like body, a magnet system having an air gap, a coil of wire, a first compliant wire suspending said coil in said air gap for rotatable movement with respect to said magnet system, and a second compliant wire suspending said body from said coil, the resonant frequency of the body and coil masses and the compliance of said first wire being about one-half the resonant frequency of the body mass and the compliance of said second wire.

HARRY B. SHAPER.

(References on following page)

REFERENCES CITED

The following references are of record in the file of this patent:

UNITED STATES PATENTS

| Number | Name | Date |
|---|---|---|
| 644,917 | Hoyt | March 6, 1900 |
| 1,916,162 | Parker | June 27, 1933 |
| 1,985,082 | Faus | Dec. 18, 1934 |
| 2,016,622 | Blumlein et al. | Oct. 8, 1935 |
| 2,077,186 | Rich | April 13, 1937 |
| 2,237,552 | Ellis | April 8, 1941 |

FOREIGN PATENTS

| Number | Country | Date |
|---|---|---|
| 787,424 | France | July 1, 1935 |
| 29,972 | Switzerland | July 11, 1904 |
| 11,279 | Great Britain (1912) | May 8, 1913 |